Figure 1:
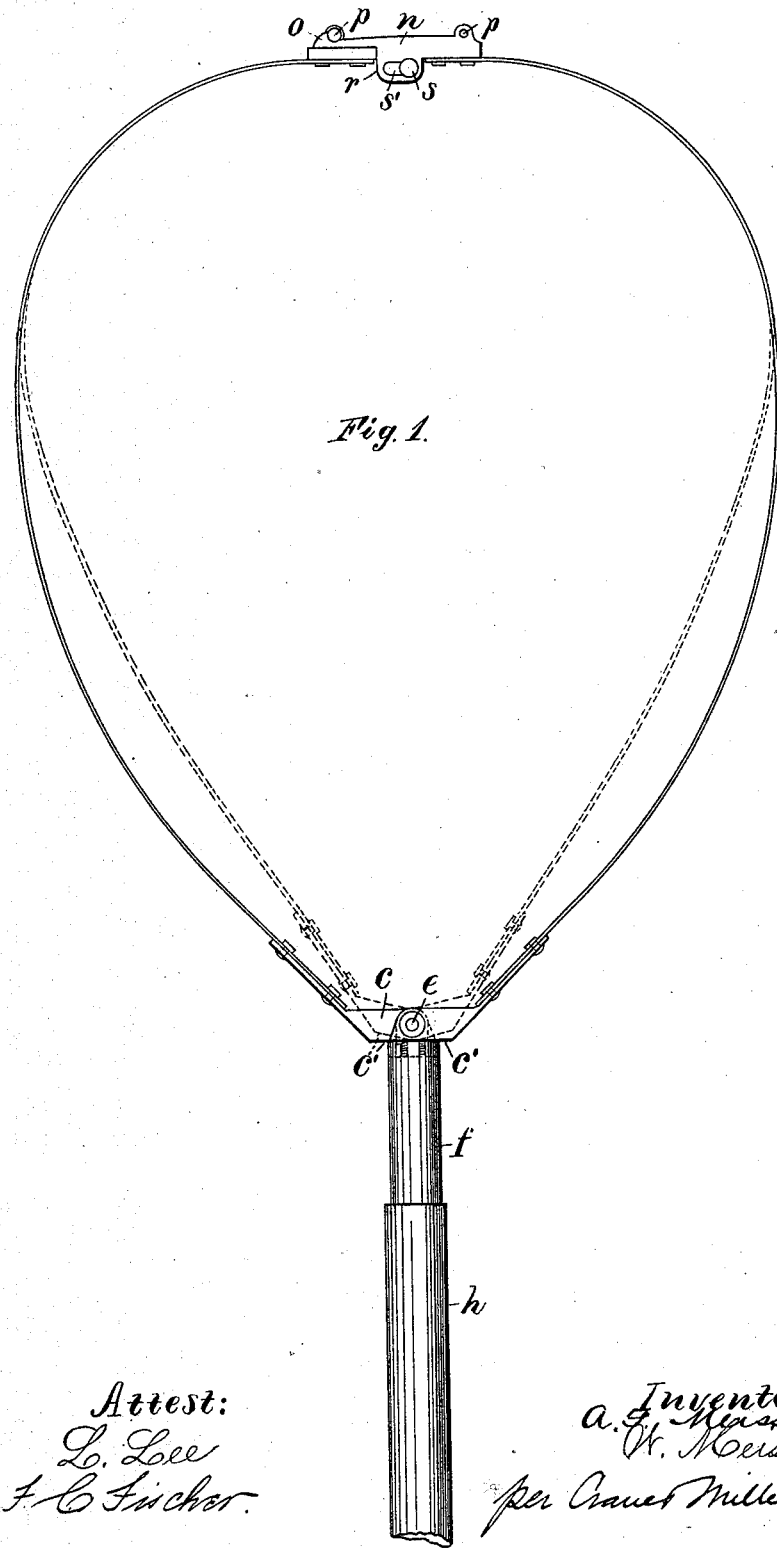

(No Model.) 2 Sheets—Sheet 1.

A. F. & W. MEISSELBACH.
FISH NET.

No. 412,773. Patented Oct. 15, 1889.

Attest:
L. Lee
F. C. Fischer

Inventors
A. F. Meisselbach
W. Meisselbach
per Craner Miller, Attys.

(No Model.) 2 Sheets—Sheet 2.
A. F. & W. MEISSELBACH.
FISH NET.
No. 412,773. Patented Oct. 15, 1889.
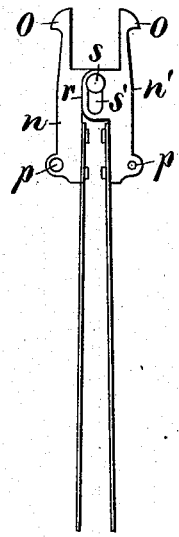
Fig. 2.
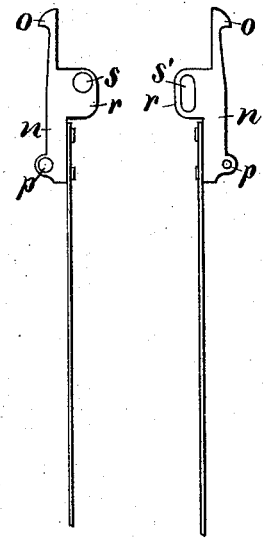
Fig. 4. Fig. 5.
Fig. 3.
Fig. 6.
Attest:
L. Lee.
F. C. Fischer.
Inventors
A. F. Meisselbach
W. Meisselbach
per Crane & Miller, attys

UNITED STATES PATENT OFFICE.

AUGUST F. MEISSELBACH AND WILLIAM MEISSELBACH, OF NEWARK, NEW JERSEY.

FISH-NET.

SPECIFICATION forming part of Letters Patent No. 412,773, dated October 15, 1889.

Application filed July 1, 1889. Serial No. 316,137. (No model.)

*To all whom it may concern:*

Be it known that we, AUGUST F. MEISSELBACH and WILLIAM MEISSELBACH, citizens of the United States, residing at Newark, Essex county, New Jersey, have invented certain new and useful Improvements in Fishermen's-Net Frames, fully described and represented in the following specification and the accompanying drawings, forming a part of the same.

This invention relates to that class of landing-net frames which are collapsible for convenience in carrying when not in use, and composed of two elastic sides or bows joined together at their ends and adapted jointly to form a loop to support the net when in use.

The object of the invention is to provide a simple and cheap construction for the net-frame; and it consists partly in the means for joining the ends of the bows with the handle and for locking them in the desired relation thereto and partly in means for joining detachably the outer ends of such bows.

In the annexed drawings, Figure 1 is a view of the frame in readiness for the application of the net, showing only a part of the handle attached thereto; Figs. 2 and 3, a side and edge view of the same in its closed position. Figs. 4 and 5 are side views of the bows and their attachments detached, and Fig. 6 a side view of the block to which the inner ends of the bows are pivoted.

In Figs. 2, 3, 4, and 5 the bows are shown with their middle portions broken away to save room upon the sheet.

$a$ $a'$ are the bows, formed of suitable elastic material.

$b$ and $b'$ are arms, each provided with ears $c$ on each edge, having their outer edges $c'$ projecting obliquely from the arms. These arms are preferably made rigid in order to give the desired curvature to the inner end of the frame, and are secured to the bows by riveting or any other suitable means.

$d$ is a pivot-block having flat sides, and having a projecting screw-shank $g$ to engage with a nut in the ferrule $f$ on the end of the handle $h$.

$e$ is a pin, preferably formed as a rivet, for hinging the ears $c$ of the arms $b$ $b'$ together and upon the flat sides of the block $d$.

In practice we form the arms $b$ $b'$ from suitable blanks, struck up by means of dies and exactly corresponding in size and shape. In order to pivot them upon the block, they are interlocked upon the block, thus bringing one ear of one arm in contact therewith on one side and one ear of the arm in contact on the opposite side.

The free ends of the bows are provided with catch-pieces $n$ and $n'$, having each at its outer end a hook $o$ and at its inner end a pin $p$, the pins projecting from opposite sides of the catch-pieces to adapt the hook upon one to engage the pin upon the other when applied to each other, as shown in Fig. 3. Each catch-piece is shown herein provided on the opposite edge from the hook with an ear $r$, one having a pin $s$ projecting therefrom to engage a slot $s'$ in the other.

When closed the frame appears as shown in Figs. 2 and 3, as is common with such class of net-frames, and it is set in its operative position in the following manner: The outer ends of the arms are bent so as to bring their ends parallel and the catches $n$ and $n'$ with their outer ends adjacent. They are then drawn toward each other, the hook upon one of its catches being passed between the pin upon the other and the bow end to which it is attached. As the bow ends are then released and allowed to spring outward, the hooks engage with the adjacent pins and lock the catches in the position shown in Fig. 1. On the completion of such coupling operation the frame assumes the shape shown in dotted lines in Fig. 1, with the lower edges of the ears $c$ upon the arms $b$ $b'$ inclined toward one another. As the ferrule $f$ is screwed upon the screw-shank $g$ and into contact with the projecting corners of the ears, they are forced backward, thus operating to turn the ears (and consequently the arms and inner ends of the bows) about the pivot $e$ until the top of the ferrule forms a firm bearing upon the flat edges of the ears, as shown in full lines in Fig. 1.

From the above description of the construction and operation of the various parts of the frame it will be seen that the arms $b$ and $b'$ may be formed each with only one ear, provided that they are pivoted upon the opposite sides of the block *d*, in order that the position of both arms may be determined, and they may be locked in such position by means of the ferrule *f*, as described. However, by forming two ears *c* upon each arm a larger bearing is exposed to the end of the ferrule, and the joint is made more rigid, and such construction is therefore preferable, although not entirely necessary.

By our construction the connection of the outer ends of the bows serves to incline their opposite ends, and consequently the arms *b* and *b'*, so that it is only necessary to fasten such frame upon the handle by means of the ferrule in order to expand the inner end of the frame and lock the same in place.

Heretofore, in analogous constructions, the arms have been pivoted at different points, which rendered necessary to expand the inner end of the frame by the hands of the user before the arms could be locked in their operative position.

It will be seen that the essential features of the coupling for the outer ends of the bows are catch-pieces attached thereto by any suitable means, one being provided with a hook on one end and the other with a pin upon the opposite end to engage the hook, in combination with the pin *s*, operating in the slot *s'*, for holding such catches in a straight line. It is therefore evident that only one of the hooks *o* and pins *p* would be necessary in order to operate as above described, although two pins and two hooks would give more rigidity to the coupling.

Although we have shown the hooks *o* herein as arranged at the outer ends of the catches and the pins *p* at the inner ends, it is very evident that their positions may be exactly reversed without departing from our invention; and we do not therefore limit ourselves to the exact arrangement of such parts shown herein.

We are aware that it is not new to form a hinge-screw coupling for a fishing-net frame of a block in two parts secured rigidly to the ends of the bows and hinged together, each being provided with a projection on the side adjacent to the other to form a split screw-shank to which the ferrule of the handle is applied, as in United States Patent No. 403,680, dated May 21, 1889, and we hereby disclaim such construction. Our invention differs from such device in having a separate block upon which the arms attached to the inner ends of the bows are pivoted detachably, the said block being formed in a single piece, having a solid screw-shank projecting therefrom for the application of a screw-socket at the end of the handle.

Having thus set forth our invention, what we claim herein is—

1. In a fisherman's-net frame, the combination, with the inner ends of the bows, of arms secured thereon, having ears with inclined outer edges, as described, a pivot-block having a solid screw-shank projecting therefrom, a pin for pivoting the arms detachably to such block by means of the said ears, and a handle provided with a ferrule adapted to be secured upon the said screw-shank in contact with the ears upon the arms, as and for the purpose set forth.

2. In a fisherman's-net frame, the combination, with the inner ends of the bows, of arms secured thereon, each having two ears with inclined edges, as described, a pivot-block having a projecting screw-shank, a pin for pivoting the arms to such block, with the said ears interlocking thereon, and a handle provided with a ferrule adapted to be secured upon the said screw-shank in contact with the ears upon the arms, as and for the purpose set forth.

3. In a fisherman's-net frame, the combination, with the outer ends of the bows *a a'*, of catch-pieces *n*, secured thereto, one being provided with a hook *o* at one end and the other with a pin *p* at the opposite end to engage the same, ears *r* upon the catch-pieces, one being provided with a slot *s'* and the other with a pin *s*, projecting through such slot, the whole arranged and operated substantially as shown and described.

4. In a fisherman's-net frame, the combination, with the outer ends of the bows *a a'*, of catch-pieces *n*, secured thereto, and provided with hooks *o* at their outer ends and pins *p* at their inner ends to engage the same, ears *r* upon the catch-pieces, one being provided with a slot *s'* and the other with a pin *s*, projecting through such slot, the whole arranged and operated substantially as shown and described.

In testimony whereof we have hereunto set our hands in the presence of two subscribing witnesses.

AUGUST F. MEISSELBACH.
WILLIAM MEISSELBACH.

Witnesses:
L. LEE,
H. J. MILLER.